Oct. 7, 1941.                G. V. HASTINGS                2,258,206
           COMBINATION PAY CHECK WITH ATTACHED RECEIPT
                         Filed Jan. 2, 1941

INVENTOR.
George V. Hastings.
BY Frederick Schafer
ATTORNEY

Patented Oct. 7, 1941

2,258,206

UNITED STATES PATENT OFFICE 2,258,206

COMBINATION PAY CHECK WITH ATTACHED RECEIPT

George V. Hastings, Wilmington, Del., assignor to E. I. du Pont de Nemours & Company, Wilmington, Del., a corporation of Delaware Application January 2, 1941, Serial No. 372,910

9 Claims. (Cl. 282—27)

This invention relates to improvements in a combination check, receipt and stub, and more particularly to a combination wage or pay check and receipt which are prepared simultaneously.

Where the receipt is merely attached to one end of the stub there is always the possibility of error in carrying forward the amount and other data from the face of the check onto the receipt. Should a stub register be used as a receipt there is not only the possibility of error between the amount of the check and the amount shown on the stub register, but there is possibility for additional error in that the payee may sign the stub register on the wrong line opposite data relating to another payee.

It is an object of this invention to provide an arrangement of stub, check and receipt in which the amount and other data on the receipt is assured to be identical with the amount and other data written in on the check. Another object of the invention is to provide an arrangement of stub, check and receipt in which data on the stub is assured to be identical with data on a permanent record. A still further object of the invention is to avoid duplication of work and prevent possibility of errors in the preparation of the check and stub and corresponding respective receipt and permanent record. Other objects will appear hereinafter.

These objects are accomplished by the following invention in which the receipt is attached to the back of the check with a sheet of carbon inserted face downwardly between the check and receipt. The receipt contains appropriately designated spaces registering with corresponding appropriately designated spaces on the check for receiving an imprint of the amount and other data written in these spaces on the check. The carbon behind that portion of the check containing the signature of the employer company authorized signer is cut out to prevent an imprint of the signature of the employer company authorized signer upon the receipt. The sheet of carbon and receipt are preferably attached to the back of the check at one edge thereof. There may be attached to another edge of the check a stub. This stub may contain on its face appropriately designated columnar spaces for various data and there is preferably a strip of carbon or manifolding material extending along the back of the stub directly behind the columnar spaces. The appropriately designated spaces on the check for the amount, check number and payroll period are in horizontal alignment with the columnar spaces on said stub.

In the accompanying drawing I have illustrated the preferred embodiment of my invention as applied to a wage check, receipt, stub showing wages earned and various deductions therefrom, and employee's permanent wage record.

Fig. 1 is a plan view of the permanent wage record with the stub superimposed thereon showing the relative position thereof for placing data simultaneously upon the stub and permanent record and simultaneously upon the wage check and wage receipt.

Fig. 2 is a plan view of the wage receipt.

Fig. 3 is a plan view of the plain side of the carbon paper showing the corner cut out.

Fig. 4 is a rear view of the combination stub, check and receipt showing the receipt and interleaved carbon partly unfolded from the back of the check.

Referring to the drawing, 1 denotes the employee's permanent wage record which is kept by the employer. The stub 2 is attached at its right hand edge to the wage check 3. As shown in the drawing the stub and check may be formed by a single strip separated merely by a perforated line which renders the stub readily detachable from the check. On the back of the right hand edge of the check 3 there is attached the wage receipt 4 and the interleaved carbon paper 5. This interleaved carbon paper contains a cut out corner directly overlying space 6 for the employee's signature on the wage receipt. This cut out portion of the interleaved carbon paper is also directly behind the space 7 for the signature of the employer company authorized signer on the superimposed wage check 3.

The stub 2 contains a number of columnar headings with spaces directly below these headings for entry of data. These columnar spaces are in horizontal alignment with the spaces for the amount and other data on the check. The headings and data on stub 2 indicate the payroll period, the hours of work regular and overtime respectively, the employee's gross earnings, deductions from earnings for taxes and other purposes, and net earnings. On the back of the stub directly behind the columnar spaces, there is a strip of carbon or manifolding material 8 which extends throughout the length of the stub.

The employee's permanent wage record contains columnar headings and spaces corresponding exactly in identity and size to those on stub 2. An exact copy of the data placed in these columnar spaces on stub 2 is made simultaneously on the employee's permanent wage record 1 by placing the stub 2 over the permanent wage record 1 in line with the columnar headings and then entering the data on stub 2. The strip of carbon or manifolding material 3 on the back of the stub 2 causes an identical imprint of the data on stub 2 to be made simultaneously on the permanent wage record 1.

Referring to Figs. 1 and 2 the check 3 contains a space in the upper left hand corner for the name and number of the employee-payee. There is a corresponding space for the name and number of the employee in the same position on the wage receipt 4, the printed words directing payment appearing only on the check. In the upper right hand corner of check 3 there is a space for the check number. There are also corresponding words and spaces in similar positions on the check 3 and wage receipt 4 indicating the check number and the payroll period. The check 3 has a space in the center of the check toward the right for the amount of pay and there is a corresponding space in the same position on the wage receipt 4 after the words "In the amount of."

These spaces for the amount, check number and payroll period on the check and receipt are in horizontal alignment with the columnar spaces on the stub so that all of such data can be written on the stub, check and receipt in one line on the bookkeeping machine. Below the amount of pay on the check 3 is the name of the employer company and in the right hand corner there is a space for the signature of the employer company authorized signer. The interleaved carbon paper 5 is cut out at its lower right corner directly behind the space on check 3 for the signature of the employer company authorized signer. This cut out corner of the interleaved carbon paper 5 prevents an impression of the signature of the employer company authorized signer from being made on the wage receipt 4.

Directly above the amount of pay on the wage receipt 4 are words indicating that the employee has received the amount of pay from the employer company. In the lower right hand corner of the wage receipt directly under the cut out corner of the interleaved carbon paper 5 is a space for the employee's signature. The name of the bank on which the check is drawn is printed in the lower left hand corner of the check 3. There is a space in the lower left hand corner of the wage receipt 4 for the name of a witness to the employee's signature.

When the check is made out all the data placed thereon except the signature of the employer company authorized signer is simultaneously imprinted upon the receipt. The check and receipt have corresponding spaces in the same position for the amount of pay, the check number, the payroll period, and the employee's name and number, and there is carbon paper interleaved between these spaces. The space on the check for the signature of the employer company authorized signer overlies a space on the receipt for the employee's signature and the interleaved carbon paper is cut out between these spaces.

An example of the use of this invention is as follows:

The stub and check with the wage receipt attached to the back of the check and the interleaved carbon paper, having the lower right hand corner cut out, is passed through an addressograph machine. The employee's name and number is addressographed on the stub and check, the interleaved carbon paper causing an imprint of the employee's name and number to be made on the receipt. The stub, check and receipt is then placed over the employee's permanent wage record with the stub in line with the columnar headings on the wage record as in Fig. 1. The data on the stub is printed by the bookkeeping machine and simultaneously therewith this data is imprinted upon the underlying employee's permanent wage record by means of the carbon or manifolding strip 8 on the back of the stub. As the columnar spaces on the stub are in horizontal alignment with the spaces on the check, the bookkeeping machine also prints on the check the amount of pay, the check number and the payroll period, which is simultaneously imprinted upon the wage receipt by the interleaved carbon paper. The stub, check and receipt is then passed through the check signing machine where the facsimile signature of the employer company authorized signer is placed on the check in the lower right hand corner. Due to the fact that the lower right hand corner of the interleaved carbon paper is cut out, this facsimile signature is printed only on the check and is not imprinted by the interleaved carbon paper on the receipt.

Although one preferred embodiment of my invention contains an interleaved carbon paper between the check and receipt with a cut out corner, it is understood that any modification or equivalent thereof is within the scope of this invention. In the present invention the interleaved carbon paper is rendered incapable of transferring an impression between the space for the signature of the employer company authorized signer on the check and the space for the employee's signature on the receipt. Another preferred embodiment of my invention contains a feather-edged carbon paper between the check and receipt with the lower portion of the feather-edged carbon paper being blank paper free from carbon. This interleaved feather-edged carbon paper consists of a single thin sheet of paper, the upper portion of which is carbon and the lower right hand corner of which is blank paper free from carbon. The lower portion of the interleaved feather-edged carbon which is blank paper free from carbon may be in the form of a strip extending along the lower edge of the interleaved feather-edged carbon paper and overlying the employee's signature on the wage receipt. Other means are also within the scope of this invention to accomplish the same result, as by covering the under surface of the lower right hand corner of the interleaved carbon paper with a plain sheet of paper.

The term "employer company authorized signer" designates the party authorized to sign the check for the employer or in whose name the check is signed for the employer.

This invention is particularly useful where it is necessary to obtain a receipt from the employee at the time the payroll check is handed to him. Such a receipt is often required where the employer is to be reimbursed for the payroll on a cost plus basis and on certain State and Federal contract work. An advantage of the invention is that the receipt remains attached to the check until the pay off of the employee, when it is torn off and signed by the employee before delivery of the check is made to the employee. This insures that a receipt is obtained from the employee before he can obtain his payroll check.

Another advantage of the invention is that there is no possibility of error between the amount and identity of the receipt and the amount and identity of the check. The recept is a carbon copy of the amount and other data on the check, except for the signature of the employer company authorized signer, and is therefore proof that the amount stated on the receipt has been paid to the employee whose signature appears thereon.

A further advantage of the present invention is that there is attached to the check delivered to the employee the stub showing the employee's time, gross earnings, deductions and net earnings. The data on the stub is assured to be in agreement with the data on the employee's permanent wage record kept by the employer as this record is a carbon copy of the data on the stub. The information given to the employee on the stub eliminates any misunderstanding as to how the employer arrived at the amount of the payroll check. A still further advantage is that the employer retains a carbon copy of the check in the form of a receipt and of the data on the stub in the form of the permanent wage record. Another advantage is that this invention eliminates any additional work in preparing a separate receipt as the existing bookkeeping machines can be used to fill out the data on the check and stub with the simultaneous imprinting of identical data on the receipt and employee's wage record respectively, thereby preventing any possibility of error. As the columnar spaces on the stub are in horizontal alignment with the spaces for the amount and other data on the check, all of such data can be written on the stub and check in one line on the bookkeeping machine.

It is to be understood that the form of my invention, herewith shown and described, is to be taken as a preferred example of the same, and that various changes in the shape, size and arrangement of parts may be resorted to, without departing from the spirit of my invention, or the scope of the appended claims.

Having thus described my invention, I claim:

1. A combination pay check and receipt, said receipt being positioned behind said check and attached to one edge thereof, a sheet of carbon paper interleaved face downwardly between said check and receipt, appropriately designated spaces on said receipt registering with appropriately designated spaces on said check for receiving an imprint of the amount and other data written in said spaces on the check, the appropriately designated space for the employee's signature on said receipt registering with the appropriately designated space for the signature of the employer company authorized signer on said check, and the portion of said interleaved carbon paper between said last mentioned spaces being cut away to prevent imprinting the signature of the employer company authorized signer on said receipt.

2. A combination pay check and receipt, said receipt being positioned behind said check, a sheet of carbon paper interleaved face downwardly between said check and receipt, an appropriately designated space on said receipt registering with an appropriately designated space on said check for receiving an imprint of the amount written in said space on the check, the appropriately designated space for the employee's signature on said receipt registering with the appropriately designated space for the signature of the employer company authorized signer on said check, and the portion of said interleaved carbon paper between said last mentioned spaces being rendered incapable of transferring an impression to prevent imprinting the signature of the employer company authorized signer on said receipt.

3. A combination pay check and receipt, said receipt being positioned behind said check and attached to one edge thereof, a sheet of feather-edged carbon paper interleaved face downwardly between said check and receipt, appropriately designated spaces on said receipt registering with appropriately designated spaces on said check for receiving an imprint of the amount and other data written in said spaces on the check, the appropriately designated space for the employee's signature on said receipt registering with the appropriately designated space for the signature of the employer company authorized signer on said check, and the portion of said interleaved feather-edged carbon paper between said last mentioned spaces being blank paper free from carbon to prevent imprinting the signature of the employer company authorized signer on said receipt.

4. A combination pay check, receipt and stub, said stub and check being formed of a single strip separated by a perforated line which renders the stub readily detachable, said receipt being positioned behind said check and attached to one edge thereof, a sheet of carbon paper interleaved face downwardly between said check and receipt, appropriately designated spaces on said receipt registering with appropriately designated spaces on said check for receiving an imprint of the amount and other data written in said spaces on the check, the appropriately designated space for the employee's signature on said receipt registering with the appropriately designated space for the signature of the employer company authorized signer on said check, the portion of said interleaved carbon paper between said last mentioned spaces being cut away to prevent imprinting the signature of the employer company authorized signer on said receipt, and appropriately designated columnar spaces on said stub for data relating to the amount of the check, said columnar spaces being in horizontal alignment with the appropriately designated space on said check for the amount.

5. A combination pay check, receipt and stub, said stub and check being formed of a single strip separated by a perforated line which renders the stub readily detachable, said receipt being positioned behind said check and attached to one edge thereof, a sheet of carbon paper interleaved face downwardly between said check and receipt, appropriately designated spaces on said receipt registering with appropriately designated spaces on said check for receiving an imprint of the amount and other data written in said spaces on the check, the appropriately designated space for the employee's signature on said receipt registering with the appropriately designated space for the signature of the employer company authorized signer on said check, the portion of said interleaved carbon paper between said last mentioned spaces being cut away to prevent imprinting the signature of the employer company authorized signer on said receipt, appropriately designated columnar spaces on said stub for data relating to the amount of the check, said columnar spaces being in horizontal alignment with the appropriately designated space on said check for the amount, and a strip of manifolding material on the back of said stub directly behind said columnar spaces.

6. A combination pay check, receipt and stub, said stub and check being formed of a single strip separated by a perforated line which renders the stub readily detachable, said receipt being positioned behind said check, a sheet of carbon paper interleaved face downwardly between said check and receipt, an appropriately designated space on said receipt registering with an appropriately designated space on said check for receiving an imprint of the amount written in said space on the check, the appropriately designated space for the employee's signature on said receipt registering with the appropriately designated space for the signature of the employer company authorized signer on said check, the portion of said interleaved carbon paper between said last mentioned spaces being rendered incapable of transferring an impression to prevent imprinting the signature of the employer company authorized signer on said receipt, and appropriately designated columnar spaces on said stub for data relating to the amount of the check, said columnar spaces being in horizontal alignment with the appropriately designated space on said check for the amount.

7. A combination pay check, receipt and stub, said stub and receipt being formed of a single strip separated by a perforated line which renders the stub readily detachable, said receipt being positioned behind said check and attached to one edge thereof, a sheet of feather-edged carbon paper interleaved face downwardly between said check and receipt, appropriately designated spaces on said receipt registering with appropriately designated spaces on said check for receiving an imprint of the amount and other data written in said spaces on the check, the appropriately designated space for the employee's signature on said receipt registering with the appropriately designated space for the signature of the employer company authorized signer on said check, the portion of said interleaved feather-edged carbon paper between said last mentioned spaces being blank paper free from carbon to prevent imprinting the signature of the employer company authorized signer on said receipt, and appropriately designated columnar spaces on said stub for data relating to the amount of the check, said columnar spaces being in horizontal alignment with the appropriately designated space on said check for the amount.

8. A combination pay check, receipt and stub, said stub and check being formed of a single strip separated by a perforated line which renders the stub readily detachable, said receipt being positioned behind said check, a sheet of carbon paper interleaved face downwardly between said check and receipt, an appropriately designated space on said receipt registering with an appropriately designated space on said check for receiving an imprint of the amount written in said space on the check, the appropriately designated space for the employee's signature on said receipt registering with the appropriately designated space for the signature of the employer company authorized signer on said check, the portion of said interleaved carbon paper between said last mentioned spaces being rendered incapable of transferring an impression to prevent imprinting the signature of the employer company authorized signer on said receipt, appropriately designated columnar spaces on said stub for data relating to the amount of the check, said columnar spaces being in horizontal alignment with the appropriately designated space on said check for the amount, and a strip of manifolding material on the back of said stub directly behind said columnar spaces.

9. Means for assuring accuracy in the preparation of a receipt and an employee's wage record corresponding respectively to a pay check and stub which comprises a stub and check formed in a single strip separated by a perforated line which renders the stub readily detachable, a receipt positioned behind said check and attached to one end thereof, a sheet of carbon paper interleaved face downwardly between said check and receipt, appropriately designated spaces on said receipt registering with appropriately designated spaces on said check for receiving an imprint of the amount and other data written in said spaces on the check, the appropriately designated space for the employee's signature on said receipt registering with the appropriately designated space for the signature of the employer company authorized signer on said check, the portion of said interleaved carbon paper between said last mentioned spaces being cut away to prevent imprinting the signature of the employer company authorized signer on said receipt, appropriately designated columnar spaces on said stub for data relating to the amount of the check, said columnar spaces being in horizontal alignment with the appropriately designated space on said check for the amount, a strip of manifolding material on the back of said stub directly behind said columnar spaces, and an employee's wage record adapted to be placed beneath said stub at the time data is written in said columnar spaces, said wage record containing appropriately designated columnar spaces corresponding to those on said stub.

GEORGE V. HASTINGS.